United States Patent
Heise

(10) Patent No.: US 10,900,551 B2
(45) Date of Patent: Jan. 26, 2021

(54) HARMONIC DRIVE

(71) Applicant: Schaeffler Technologies AG & Co. KG, Herzogenaurach (DE)

(72) Inventor: Daniel Heise, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/484,653

(22) PCT Filed: Feb. 16, 2018

(86) PCT No.: PCT/DE2018/100140
§ 371 (c)(1),
(2) Date: Aug. 8, 2019

(87) PCT Pub. No.: WO2018/153407
PCT Pub. Date: Aug. 30, 2018

(65) Prior Publication Data
US 2020/0003289 A1    Jan. 2, 2020

(30) Foreign Application Priority Data
Feb. 27, 2017    (DE) .................. 10 2017 103 988

(51) Int. Cl.
| F16H 33/00 | (2006.01) |
| F16H 35/00 | (2006.01) |
| F16H 37/00 | (2006.01) |
| F16H 49/00 | (2006.01) |

(52) U.S. Cl.
CPC ..... F16H 49/001 (2013.01); *F16H 2049/003* (2013.01)

(58) Field of Classification Search
CPC .................. F16H 49/001; F16H 2049/003
See application file for complete search history.

(56) References Cited

U.S. PATENT DOCUMENTS

| 3,182,525 A | 5/1965 | Tinder et al. |
| 3,187,862 A | 6/1965 | Walton |
| 3,461,997 A | 8/1969 | Humphreys |
| 2018/0038467 A1* | 2/2018 | Balsiger ................ F16H 49/001 |

FOREIGN PATENT DOCUMENTS

| DE | 10021236 A1 | 11/2001 |
| DE | 102005020305 A1 | 11/2006 |
| DE | 102009017875 A1 | 10/2009 |
| DE | 2013220220 A1 | 4/2015 |
| DE | 102014210360 A1 | 12/2015 |
| EP | 0514829 B1 | 11/1992 |
| EP | 0741256 B1 | 11/1996 |
| JP | H04370445 A | 12/1992 |

* cited by examiner

*Primary Examiner* — Jake Cook
(74) *Attorney, Agent, or Firm* — Matthew Evans

(57) ABSTRACT

A harmonic drive comprises a wave generator, a resilient, geared transmission element that can be deformed by the wave generator, a connecting element on the housing side, and a connecting element on the output side. The resilient transmission element has two different tooth systems, a spline tooth system and a running tooth system; the spline tooth system is coupled along the entire circumference to one of the connecting elements for conjoint rotation therewith, and the running tooth system is provided for cooperation with the wave generator and partial engagement in a mating running tooth system on the other connecting element.

19 Claims, 3 Drawing Sheets

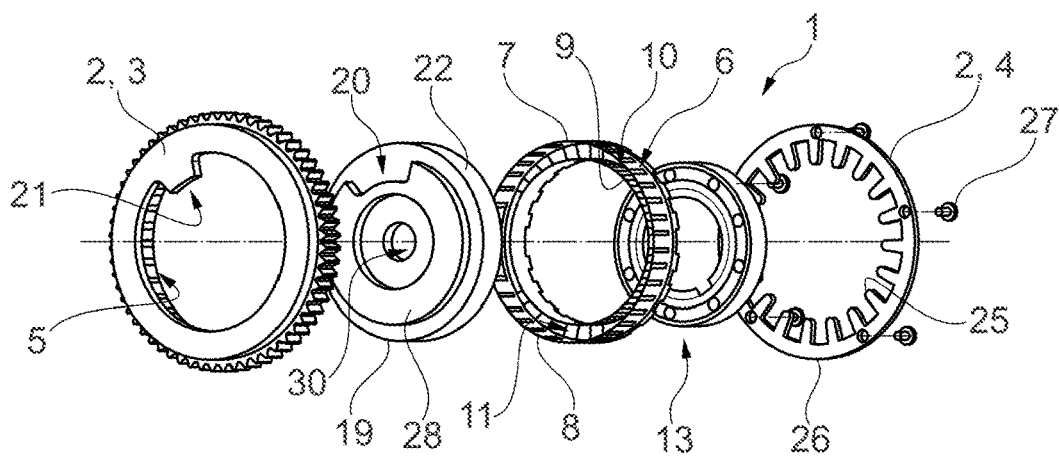
Fig. 1
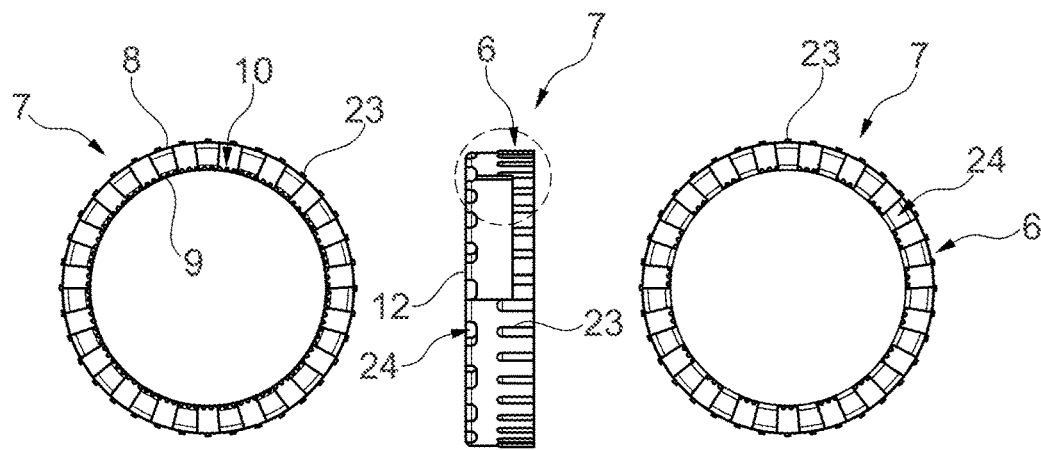
Fig. 2    Fig. 3    Fig. 4
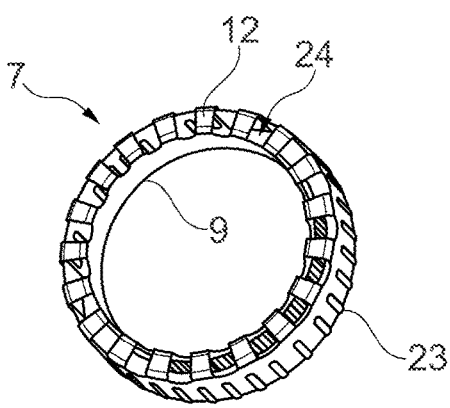
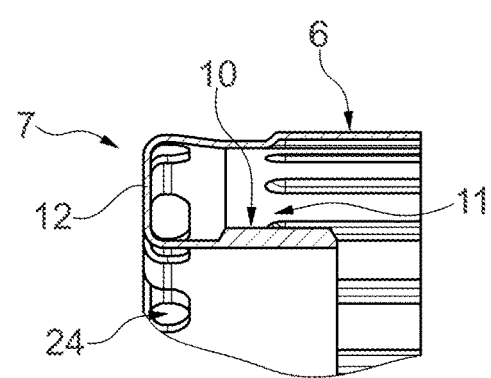
Fig. 5    Fig. 6

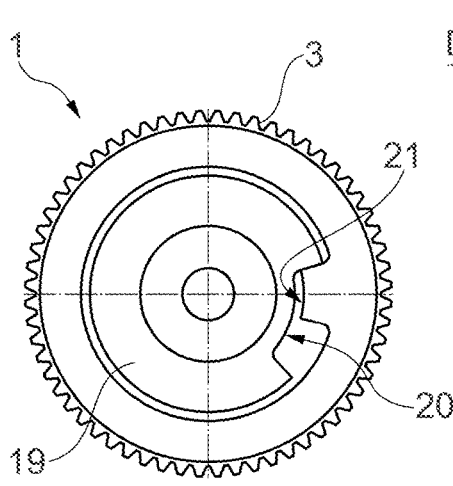
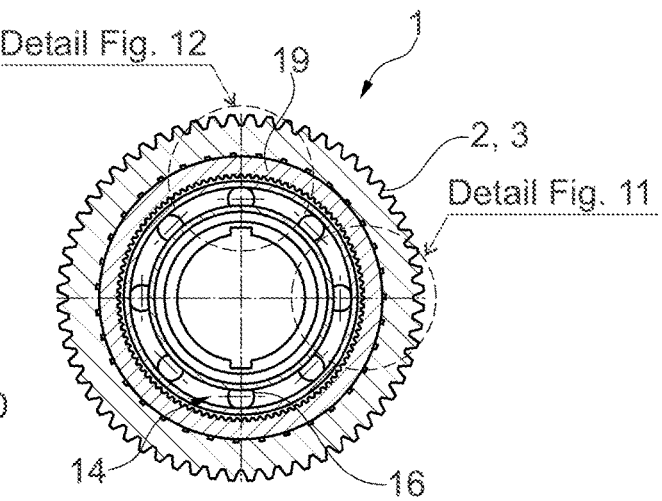
Fig. 7　　　　Fig. 8
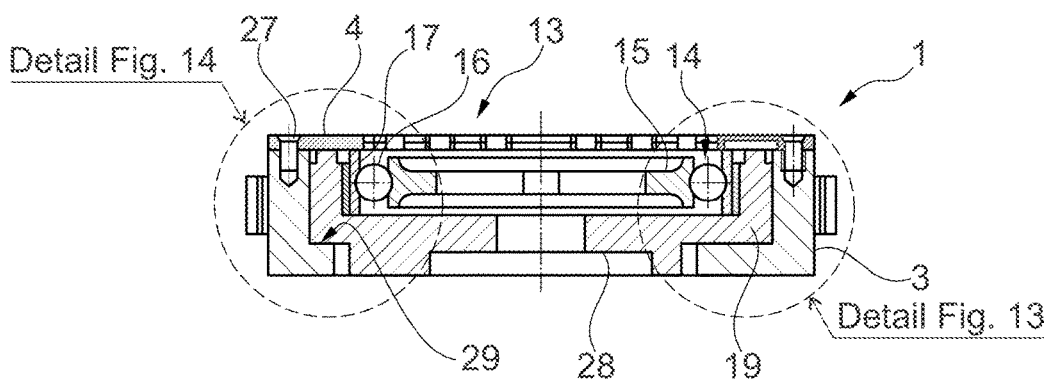
Fig. 9
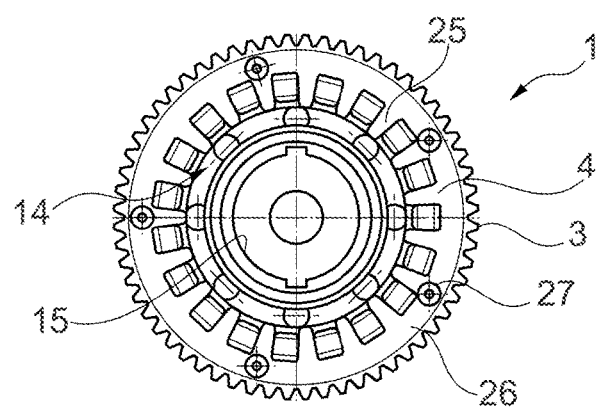
Fig. 10

HARMONIC DRIVE

CROSS REFERENCE TO RELATED APPLICATIONS

This application is the U.S. National Phase of PCT Application No. PCT/DE2018/100140 filed Feb. 16, 2018 which claims priority to DE 10 2017 103 988.0 filed Feb. 27, 2017, the entire disclosures of which are incorporated by reference herein.

TECHNICAL FIELD

This disclosure relates to a harmonic drive, which can be used as an actuating gear, for example, in an electric camshaft adjuster or in a device for varying the compression ratio of a reciprocating piston engine.

BACKGROUND

A harmonic drive of this kind is known from DE 10 2014 210 360 A1, for example. Another harmonic drive of the type in question is disclosed in DE 10 2013 220 220 A1, for example. These known harmonic drives have special design features for ensuring the lubricant supply.

Owing to the principle involved, harmonic drives operate with a flexible transmission element. This can be a flex ring, for example, as described in the documents cited at the outset. A flex ring is a simple ring which is circular when not subject to mechanical stress and which has a single tooth system, namely an external tooth system. As an alternative, a flexible transmission element of a harmonic drive can have a radially outward-oriented or inward-oriented flange which adjoins a substantially cylindrical region of the transmission element, which has teeth at least in some section or sections. If the flange is outward-oriented, the flexible transmission element is also referred to as a collared sleeve. By way of example, attention is drawn in this context to EP 0 741 256 B1. If, on the other hand, the flange of the elastic transmission element is radially inward-oriented, the transmission element describes a cup shape overall. As regards a possible configuration of a cup-shaped transmission element of this kind, attention is drawn by way of example to EP 0 514 829 B1.

Irrespective of whether a flex ring, a collared sleeve or a cup-shaped element is provided as the flexible transmission element of a harmonic drive, the flexible transmission element can be coupled in different ways to two further transmission elements, each of which is inherently rigid: DE 10 2005 020 305 A1 shows a rolling contact bush of a harmonic drive, said bush having two tooth systems, which are designed as an internal and an external tooth system. The rolling contact bush has different wall thicknesses and forms a tubular membrane. Additional flexible sleeves can be found in U.S. Pat. No. 3,182,525 A, DE 10 2009 017 875 A1, DE 100 21 236 A1 and JP H04-370 445 A.

Within the harmonic drive, there is a need for coupling of the elastic transmission element for conjoint rotation to a first inherently rigid transmission element, which can be a housing part. In the case of a flex ring, this coupling for conjoint rotation is established by bringing the flex ring, which is forced permanently into a noncircular shape by a wave generator, into engagement in the region of its largest diameter, i.e. in two diametrically opposite sections of the circumference, with a tooth system of the inherently rigid transmission element, in particular the housing element. As the wave generator operates, there is a cyclic revolution of the engagement regions between the flexible and the inherently rigid transmission element, wherein an identical number of teeth on both transmission elements is used to ensure that the angular relationship between these transmission elements is invariable. The coupling for conjoint rotation thereby obtained between the flexible transmission element and the first inherently rigid transmission element is accordingly also referred to as a coupling stage of the harmonic drive.

In contrast to a flex ring, a collared sleeve, like a cup-shaped flexible transmission element, has different regions, which are subjected only partially to deformations during the operation of the harmonic drive. In this case, the radially outward- or inward-directed flange of the collared sleeve or of the cup-shaped transmission element forms an inherently rigid annular section which can be secured, typically screwed, to the first inherently rigid transmission element. One basic difference between a flex ring, on the one hand, and a collared sleeve and a cup-shaped transmission element, on the other hand, is thus that the flex ring is deformed as a whole during the operation of the harmonic drive, whereas, in the case of the collared sleeve and of the cup-shaped transmission element, only a partial region of the respective transmission element is subject to deformations.

Common to all three designs of elastic transmission element which have been mentioned is that a flexible region of the respective transmission element interacts with a second inherently rigid transmission element in such a way that there is a rotation during the operation of the harmonic drive between the flexible transmission element and the second inherently rigid transmission element and hence also between the two inherently rigid transmission elements. Irrespective of the geometry of the flexible transmission element, this rotation between the two inherently rigid transmission elements can also be brought about by the tooth system of the flexible transmission element having a different number of teeth from the tooth system of the second inherently rigid transmission element which meshes therewith. In all cases, a torque and driving power are transmitted between the tooth system of the flexible transmission element and the tooth system of the second inherently rigid transmission element.

SUMMARY

It is the underlying object of the disclosure to indicate a harmonic drive which has been developed further than the cited prior art and which is distinguished by a particularly favorable ratio between mechanical loadbearing capacity, installation space utilization and ease of assembly.

According to the disclosure, this object is achieved by a harmonic drive having the features described herein. In terms of basic design which is known per se, the harmonic drive has a wave generator and a flexible, toothed transmission element that can be deformed by the wave generator during the operation of the harmonic drive. Other components of the harmonic drive are two connecting elements, each of which is inherently rigid, namely a connecting element on the housing side and a connecting element on the output side. The housing of the harmonic drive can be incorporated into a surrounding structure, either rigidly or rotatably, and therefore the connecting element on the housing side can be either a non-rotatable or a rotatable element. In contrast, the connecting element on the output side of the harmonic drive is a rotatable element in all cases. The flexible transmission element is coupled either to the connecting element on the housing side or to the connecting element on the output side for conjoint rotation therewith, while it is rotatable relative to the other connecting element in each case. The flexible transmission element has two different tooth systems, namely a spline tooth system and a running tooth system, wherein the spline tooth system is coupled along the entire circumference to one of the connecting elements for conjoint rotation therewith, and the running tooth system is provided for interaction with the wave generator and partial engagement in a mating running tooth system on the other connecting element.

The flexible transmission element is thus coupled to an inherently rigid transmission element, i.e. connecting element, not only in individual sections of the circumference but over the entire circumference, namely by means of the spline tooth system. The coupling stage, which is implemented with the aid of the spline tooth system, is thus capable of bearing significantly higher mechanical loads in comparison with a harmonic drive that has a conventional flex ring, and this is also beneficial for the endurance of the harmonic drive. At the same time, the harmonic drive does not require special fastening elements, e.g. screws, for fastening the flexible transmission element on another transmission element of the kind that are required particularly in the case of conventional harmonic drives with collared sleeves or cup-shaped transmission elements. The entire harmonic drive can thus be of extremely compact configuration in relation to the torques transmitted.

The spline tooth system is not only spatially separate from the running tooth system of the flexible transmission element but also has a different profile. In principle, the different tooth systems of the flexible transmission element can be internal tooth systems or external tooth systems. Both tooth systems can be designed as internal tooth systems or both tooth systems can be designed as external tooth systems. In principle, however, designs in which one tooth system is designed as an internal tooth system and the other tooth system of the flexible transmission element is designed as an external tooth system are also possible. The pitch circle diameters of the different tooth systems can be different.

In an example embodiment of the disclosure, both the running tooth system and the spline tooth system are designed as external tooth systems.

In the embodiment of the disclosure described herein, the two tooth systems of the flexible transmission element are nested radially one inside the other, wherein they overlap when viewed in the axial direction. This means that there is at least one plane which is normal to the center line of the flexible transmission element and intersects both the spline tooth system and the running tooth system. In this case, the spline tooth section of the flexible transmission element is connected to the running tooth section via a section which is substantially annular-disk-shaped overall and which lies in a plane parallel to the plane mentioned, resulting in a U-shaped cross-section of the flexible transmission element, wherein the spline tooth system and the running tooth system are each arranged on one leg of the U. The U-shaped cross-section of the flexible transmission element can be of symmetrical or asymmetrical configuration. In the latter case, the leg of the U on which the spline tooth system is situated can be longer than the leg of the U on which the running tooth system is situated. In both cases, the U-shaped cross-section of the flexible transmission element forms an annular space which is open toward one end of this transmission element.

In an example embodiment, the transmission element which has the mating running tooth system interacting directly with the running tooth system of the flexible transmission element engages in the annular space formed by the flexible transmission element. The transmission element having the mating running tooth system can be the connecting element on the output side of the harmonic drive. A lateral surface, arranged within the annular space, of the transmission element provided with the mating running tooth system can be provided with sliding support directly by the section of the flexible transmission element which has the spline tooth system. Here, a radial force is introduced into one of the connecting elements, potentially the connecting element on the housing side, via the section of the flexible transmission element which is provided with the spline tooth system. In an example embodiment, the connecting element on the housing side is here formed by the housing of the harmonic drive itself, and therefore there is no need for an additional component, e.g. in the form of a coupling ring gear screwed to the housing.

Irrespective of whether the spline tooth system is held directly or indirectly on the housing of the harmonic drive, the spline tooth system engages in a corresponding mating contour on the housing side over its entire circumference in every operating state of the harmonic drive. The spline tooth system is situated on a substantially cylindrical section of the flexible transmission element, wherein—when viewed in the axial direction—it does not extend over the entire section mentioned. On the contrary, a section projecting beyond the spline tooth system, which can still be seen as part of the cylindrical section, can be configured and arranged within the harmonic drive in such a way that it can absorb at least a small proportion of the elastic deformations of the flexible transmission element. Here, the deformations can be distributed over the entire circumference of the flexible transmission element, thus avoiding stress peaks of the kind that are conceivable in the case of elastic elements fixed by means of screwed joints, for example. Despite a thin-walled configuration, the flexible transmission element is therefore capable of bearing high mechanical loads.

The two substantially cylindrical sections of the flexible transmission element, which are arranged concentrically with one another and each have a tooth system, can be connected integrally to one another by a ring section of elastic configuration at the end. In order to give the ring section at the end a particularly pronounced, defined elastic flexibility, primarily in the radial direction of the transmission element, this section can be interrupted by a plurality of recesses distributed over the circumference. Despite these recesses, the ring section at the end operates as a torque-transmitting section of the flexible transmission element. The number of recesses can be uneven, ensuring that there is no pair of recesses which is arranged in mirror symmetry on the circumference of the flexible transmission element. Step changes in the bending stiffness of the flexible transmission element are thereby avoided.

In a manner comparable in principle with the arrangement of the spline tooth system, the running tooth system of the flexible transmission element can be also spaced apart in the axial direction from the ring section at the end, thus enabling the section in between to be used as a deformation section during the operation of the harmonic drive. Overall, the flexible transmission element thus has a high flexibility, which ensures that the section which has the spline tooth system always remains in an unchanged form, while the section which has the running tooth system adapts continuously to the noncircular shape enforced by the wave generator.

The running tooth system of the flexible transmission element can be configured as an involute tooth system, for example. This means that, by virtue of the partial adaptation of the running tooth system to the mating running tooth system of the connection element, in particular of the output element, it is possible both to transmit a torque and to produce radial forces which tend to have the effect of expanding the transmission element provided with the mating running tooth system. In contrast to the flexible transmission element, the transmission element provided with the mating running tooth system is an inherently rigid transmission element, i.e. a transmission element with a negligibly small elastic flexibility.

The spline tooth system can be a tooth system which—in a manner comparable in principle with the running tooth system—has profiling which, in the course of torque transmission, necessarily also produces radial forces. In the case of the spline tooth system, these radial forces can be used selectively to produce a braking effect. The spline tooth system and the corresponding mating contour on one of the inherently rigid transmission elements are designed in such a way that, beyond a certain limiting torque, the spline tooth system is partially lifted out of the mating contour. This change in the geometry in the radial direction of the harmonic drive can be used selectively, in the sense of a braking function, to increase radial forces acting in the sliding bearing arrangement formed in the region of the spline tooth system. In extreme cases, the braking effect can lead to damage-free locking up of the harmonic drive in the event of an overload. In operating states in which the harmonic drive is braked only slightly or moderately in the manner described, this braking function contributes significantly to the suppression of vibrations within the transmission and, by this means alone, reduces the stress on mechanical components, in particular the flexible transmission element.

In embodiments which do not have the braking function described, in which a central role is played by the spline tooth system, the spline tooth system can have a toothing profile with a flank angle of 90° in contrast to the running tooth system. In this case, in which the flanks of the tooth system are aligned exactly in the radial direction of the transmission elements, torque loading of the flexible transmission element is not converted into radial loads acting on the housing of the harmonic drive.

In all cases, the tooth system on the housing side interacting with the spline tooth system of the flexible transmission element can be efficiently integrated into a harmonic drive housing part produced as a sintered component. Such a tooth system can likewise also be produced by other primary forming methods, e.g. by casting or by machining methods.

In contrast to the connecting element on the housing side and that on the output side, the flexible transmission element is a sheet-metal component in an example embodiment.

In an example embodiment of the disclosure, the spline tooth system can be produced by forming the teeth thereof as embossed features. The embossed features can be recognized as such, in particular, by the fact that they appear as a negative contour, i.e. as individual depressions, on the side of the corresponding section of the flexible transmission element which faces away from the spline tooth system. In an example embodiment, the teeth of the spline tooth system are significantly larger than the teeth of the running tooth system. Smooth surface sections of the flexible transmission element, which describe a cylindrical surface overall, can be arranged between the individual teeth of the spline tooth system.

According to an example embodiment, the housing of the harmonic drive is covered by a front cover on that end on which the ring section of the flexible transmission element is situated, said cover having a plurality of tongues that are oriented inward in the radial direction and each engage in a recess of the ring section and that act as contact surfaces. By means of these contact surfaces, the connecting element on the output side and the wave generator are advantageously also provided with support in the axial direction within the harmonic drive in addition to the flexible transmission element. On the other hand, torque transmission between the flexible transmission element and the front cover is not provided in the example embodiment. Accordingly, screws by means of which the front cover is secured on the housing, which can be identical with the connecting element on the housing side, can be designed to transmit only low forces, namely forces acting exclusively or predominantly in the axial direction. Countersunk screws are suitable for securing the front cover on the housing, for example. The recesses in which the tongues of the front cover engage also have the functions of openings through which lubricant, in particular oil, can be passed. In this way, not only the tooth systems but also the sliding bearing surfaces can be reliably supplied with lubricant.

On the opposite end of the housing from the front cover, the connecting element on the output side can be supported in the axial direction directly by an offset on the connecting element on the housing side. In the same axial direction, the connecting element on the output side can perform a bearing function in relation to the flexible transmission element and in relation to the wave generator. Overall, numerous components of the harmonic drive thus perform multiple functions, this being advantageous both as regards efficient assembly and also as regards a compact and, at the same time, robust construction of the harmonic drive.

The harmonic drive is equally suitable for stationary applications, e.g. in industrial robots, and for use in motor vehicles. In the latter case, the harmonic drive is an actuating gear of an electric camshaft adjuster or a device for varying the compression ratio of a reciprocating piston engine, for example.

BRIEF DESCRIPTION OF THE DRAWINGS

An illustrative embodiment of the disclosure is explained in greater detail below with reference to a drawing. In the drawings:

FIG. 1 shows a harmonic drive in an exploded illustration,

FIGS. 2 to 5 show a flexible transmission element of the harmonic drive shown in FIG. 1.

FIG. 6 shows a detail of the flexible transmission element,

FIG. 7 shows a first end view of the harmonic drive,

FIGS. 8 and 9 show different sections through the harmonic drive,

FIG. 10 shows a second end view of the harmonic drive,

DETAILED DESCRIPTION OF THE EMBODIMENTS

Figure 11:
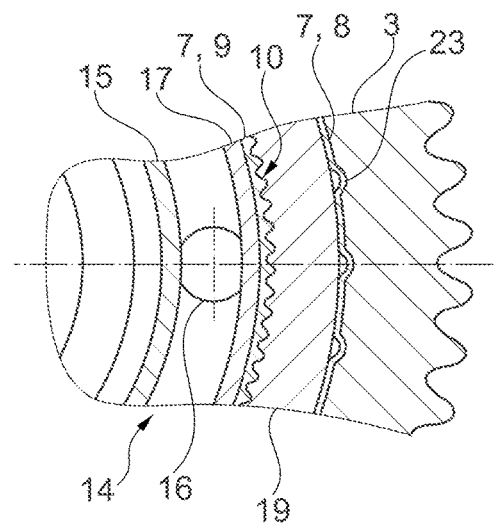
FIGS. 11 and 12 show details "D11" and "D12" from FIG. 8.
Figure 12:
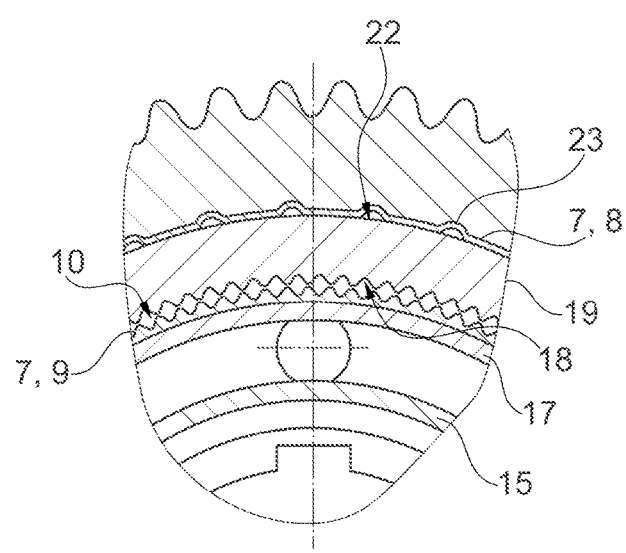
Figure 13:
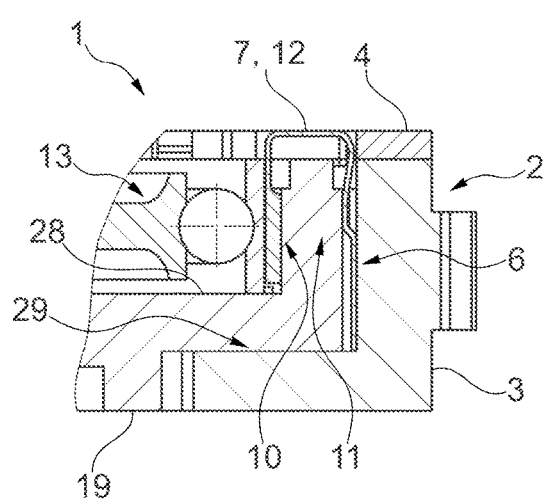
FIGS. 13 and 14 show details "D13" and "D14" from FIG. 9.
Figure 14:
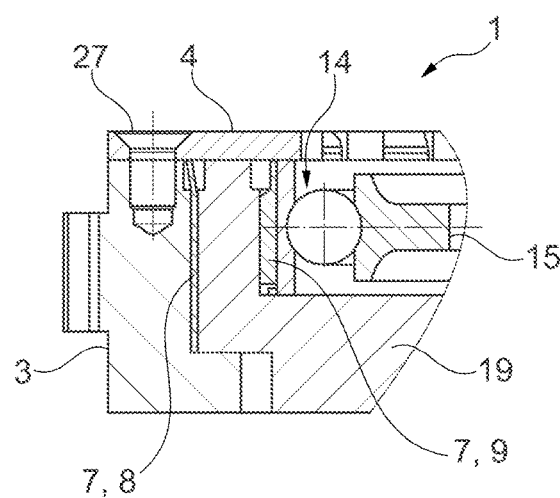

A harmonic drive denoted overall by the reference character 1 is provided for use as an actuating gear of an electric camshaft adjuster. A housing 2 of the harmonic drive 1 is assembled from a connecting element 3 on the housing side and a front cover 4. Here, the connecting element 3 on the housing side is designed as a chain sprocket and is driven in a manner known per se by means of the crankshaft of an internal combustion engine, rotating at half the speed of the crankshaft.

Formed on the inner circumference of the connecting element 3 on the housing side is a toothing contour 5, in which a spline tooth system 6 on the outer circumference of a flexible transmission element 7 engages. The flexible transmission element 7 is thus coupled to the housing 2 for conjoint rotation therewith.

The flexible transmission element 7 has the basic shape of a channel which is bent into a circular ring and is thus closed. Here, the spline tooth system 6 is formed by an encircling outer wall, also referred to as spline toothing wall 8. Concentrically within the spline toothing wall 8 is a running toothing wall 9, which forms a running tooth system 10. Both tooth systems 6, 10 are oriented radially outward. The annular space formed between the spline toothing wall 8 and the running toothing wall 9 is denoted by 11. Toward the end facing the front cover 4, the annular space 11 is delimited by a ring section 12, which connects the spline toothing wall 8 to the running toothing wall 9. In cross-section, the flexible transmission element 7 describes a U shape, wherein the spline toothing wall 8 and the running toothing wall 9 each form one leg of the U and the ring section 12 forms the base of the U.

Arranged radially inside the flexible transmission element 7 is a wave generator 13, which comprises a rolling bearing 14, namely a ball bearing. As an alternative, the wave generator 13 could also operate with a sliding bearing.

The rolling bearing 14 comprises an inner ring 15 with a noncircular, elliptical outer contour, on which rolling elements 16, namely balls, roll. The associated outer ring is denoted by 17 and, in contrast to the inner ring 15, is of flexible configuration. In a manner not shown, the inner ring 15 is driven by means of an adjusting shaft, wherein a compensating coupling, in particular an Oldham coupling, can be arranged ahead of the inner ring 15. It is likewise possible for the inner ring 15 itself to be a component of a compensating coupling. In all cases, the outer ring 17 adapts continuously to the noncircular shape of the inner ring 15 during rotation of the inner ring 15. The outer ring 17 is surrounded by the flexible transmission element 7, wherein the running toothing wall 9 rests on the outer ring 17 without being connected thereto in a fixed manner.

The running tooth system 10 interacts directly with a mating running tooth system 18, which is formed by an inherently rigid transmission element 19. In the present case, the inherently rigid transmission element 19 is a connecting element on the output side, namely an output ring gear.

On the end of the output ring gear 19 which faces away from the front cover 4 it is possible to see a rotation angle limiting contour 20, which interacts with a rotation angle limiting contour 21 of the connecting element 3 on the housing side.

While the output ring gear 19 is provided on the inner circumference with the mating running tooth system 18, the outer circumference of the output ring gear 19 is configured as a smooth cylindrical surface. This is a sliding bearing surface 22, which makes contact with the inside of the spline toothing wall 8, ensuring that there is sliding support in the flexible transmission element 7 for the output ring gear 19 as the connecting element on the output side. The connecting element 19 on the output side, including the mating running tooth system 18, is produced as a sintered component. In contrast, the flexible transmission element 7 is a metal component produced by forming, namely a sheet-metal part. By virtue of the sliding support for the output ring gear 19 in the flexible transmission element 7, the output ring gear 19 is also supported in such a way as to be pivotable relative to the housing 2, wherein the pivoting angle is limited by the rotation angle limiting contours 20, 21.

The connecting element 19 on the output side is supported in the housing 2 with as little radial play as possible. This ensures that the spline tooth system 6 of the flexible transmission element 7 always engages over the full circumference of the transmission element 7 and of the connecting element 3 on the housing side in the toothing contour 5 of the connecting element 3. The torque to be transmitted between the flexible transmission element 7 and the connecting element 3 on the housing side is thus transmitted uniformly over the entire circumference of the flexible transmission element 7 and of the connecting element 3. A thin-walled configuration of the spline toothing wall 8 is thus sufficient. The individual teeth, denoted by 23, of the spline tooth system 6 are produced as embossed features, wherein they appear as a negative shape on the inside of the spline toothing wall 8. Accordingly, the sliding bearing surface formed by the spline toothing wall 8 is interrupted by individual, axially aligned grooves.

In comparison with the spline tooth system 6, the running tooth system 10 has a significantly smaller pitch. Unlike the spline tooth system 6, which is engaged over the full circumference by the toothing contour 5 of the connecting element 3 on the housing side, the running tooth system 10 engages in the mating running tooth system 18 only at two diametrically opposite sections of the circumference. A number of teeth in the running tooth system 10 which differs slightly, namely by two, from the number of teeth in the mating running tooth system 18 ensures in a manner known per se that the connecting element 19 on the output side rotates slightly relative to the flexible transmission element 7 and thus also relative to the housing 2 during one full revolution of the inner ring 15. The harmonic drive 1 thus forms an actuating gear with a large reduction.

By virtue of the coupling of the flexible transmission element 7 to the connecting element 3 on the housing side for conjoint rotation therewith by means of the tooth systems 5, 6, no special fastening elements, e.g. screws, are required to fasten the flexible transmission element 7 on the housing 2. When considered in the axial direction of the connecting elements 3, 19 and hence of the entire harmonic drive 1, there is an overlap between the different tooth systems 6, 10 of the flexible transmission element 7. This means that there is at least one plane which is normal to the axis of rotation of the harmonic drive 1 and intersects both the spline tooth system 6 and the running tooth system 10. In the present case, the width of the spline tooth system 6, measured in the axial direction, is somewhat greater than the width of the running tooth system 10, measured in the same direction. The overall spline toothing wall 8 is significantly wider than the running toothing wall 9, likewise measured in the axial direction. Both the spline toothing wall 8 and the running toothing wall 9 have a smooth, toothless section in addition to the toothed section, wherein the toothless sections make a rounded transition into the ring section 12 at the end of the flexible transmission element 7.

The ring section 12 at the end has an uneven number of recesses 24, namely 19, distributed uniformly over the circumference. A tongue 25 engages in each of these recesses 24, wherein the tongues 25 are integral parts of the front cover 4 and are oriented radially inward. The tongues 25 are formed integrally on a cover ring 26, which is formed by the front cover 4 and which is fastened on the connecting element 3 on the housing side by means of countersunk screws 27. By means of the tongues 25, the flexible transmission element 7 and the connecting element 19 on the output side are secured within the housing 2 in the axial direction. Since the tongues 25 project inward beyond the flexible transmission element 7 in the radial direction, the front cover 4 furthermore also forms a securing means that acts in the axial direction relative to the wave generator 13. Starting from the section 12 at the end, the recesses 24 in which the tongues 25 engage extend into the spline toothing wall 8 and into the running toothing wall 9. Thus, the transmission element 7 has a high flexibility in the radial direction and, at the same time, the running tooth section 8 is connected rigidly to the spline tooth section 8 in the circumferential direction. The edges of the recesses 24 which lie in the spline toothing wall 8 and in the running toothing wall 9 are rounded in a manner optimized for stress.

On the end facing away from the front cover 4, the wave generator 13 and the flexible transmission element 7 are secured in the axial direction against displacement in the axial direction by a disk section, denoted by 28, of the connecting element 19 on the output side. The connecting element 19 on the output side is, in turn, supported axially in the same direction by an annular circumferential shoulder 29 on the connecting element 3 on the housing side. The connecting element 19 on the output side has a central hole 30, which is provided for the insertion of a central screw (not illustrated), by means of which connecting element 19 can be connected to the camshaft to be adjusted.

REFERENCE CHARACTERS 1 harmonic drive
2 housing
3 connecting element on the housing side
4 front cover
5 toothing contour
6 spline tooth system
7 flexible transmission element
8 spline toothing wall
9 running toothing wall
10 running tooth system
11 annular space
12 ring section
13 wave generator
14 rolling bearing
15 inner ring
16 rolling element
17 outer ring
18 mating running tooth system
19 output ring gear, connecting element
20 rotation angle limiting contour
21 rotation angle limiting contour
22 sliding bearing surface
23 tooth
24 recess
25 tongue
26 cover ring
27 countersunk screw
28 disk section
29 shoulder
30 hole

The invention claimed is:
1. A harmonic drive comprising:
a wave generator,
a flexible, toothed transmission element that can be deformed by the wave generator,
a first connecting element on a housing side, and
a second connecting element on an output side, and
the flexible, toothed transmission element has a spline tooth system and a running tooth system, the spline tooth system coupled along a circumference of one of the first or second connecting elements for conjoint rotation therewith, and the running tooth system provided for interaction with the wave generator and partial engagement in a mating running tooth system on the other one of the first or second connecting element, and
the spline tooth system and the running tooth system are nested radially within one another and overlap in an axial direction.

2. The harmonic drive of claim 1, wherein an annular space, within which the second connecting element having the mating running tooth system engages, is formed radially between the spline tooth system and the running tooth system.

3. The harmonic drive of claim 2, wherein the second connecting element which has the mating running tooth system is provided with sliding support on a section of the flexible, toothed transmission element which has the spline tooth system.

4. The harmonic drive of claim 1, wherein a section of the flexible, toothed transmission element which has the spline tooth system is wider in the axial direction than a section of the flexible, toothed transmission element which has the running tooth system.

5. The harmonic drive of claim 1, wherein a section of the flexible, toothed transmission element which has the spline tooth system is connected to a section of the flexible, toothed transmission element which has the running tooth system by a ring section the ring section having a plurality of recesses distributed over the circumference.

6. The harmonic drive of claim 5, wherein the recesses, starting from the ring section, extend into the section having the spline tooth system and into the section of the flexible, toothed transmission element which has the running tooth system.

7. The harmonic drive of claim 5, wherein the ring section is covered by a front cover, the front cover having a plurality of tongues that are aligned in a radial direction and each engage in a recess that form contact surfaces in the axial direction for at least one of the wave generator, the flexible, toothed transmission element, or the first or second connecting element provided with the mating running tooth system.

8. The harmonic drive according of claim 5, wherein the plurality of recesses comprises an uneven number of recesses.

9. The harmonic drive of claim 1, wherein a difference in a number of teeth in the running tooth system and a number of teeth in the mating running tooth system is two.

10. The harmonic drive of claim 1, wherein the running tooth system of the flexible, toothed transmission element is configured as an involute tooth system.

11. A harmonic drive comprising:
a wave generator,
a flexible transmission element deformable by the wave generator,
a first connecting element on a housing side, and
a second connecting element on an output side, and
the flexible transmission element configured with a spline tooth system and a running tooth system, the spline tooth system coupled along a circumference of one of the first or second connecting elements for conjoint rotation therewith, and the running tooth system provided for interaction with the wave generator and partial engagement in a mating running tooth system on the other one of the first or second connecting element, and both the spline tooth system and the running tooth system are configured as external tooth systems.

12. The harmonic drive of claim 11, wherein a pitch of the spline tooth system is larger than a pitch of the running tooth system.

13. A harmonic drive comprising:
a wave generator,
a flexible transmission element deformable by the wave generator,
a first connecting element on a housing side, and
a second connecting element on an output side, and
the flexible transmission element configured with a spline tooth system and a running tooth system, the spline tooth system coupled along a circumference of one of the first or second connecting elements for conjoint rotation therewith, and
the running tooth system provided for interaction with the wave generator and partial engagement in a mating running tooth system on the other one of the first or second connecting element, and
teeth of the spline tooth system are formed as embossed features in a wall of the flexible transmission element, the embossed features configured as a negative contour on a radial inner surface of the wall.

14. The harmonic drive of claim 13, wherein the wave generator comprises a rolling bearing.

15. The harmonic drive of claim 14, wherein the rolling bearing comprises rolling elements and an inner ring with a noncircular outer contour on which the rolling elements roll.

16. The harmonic drive of claim 13, wherein the spline tooth system of the flexible transmission element engages over a full circumference of the first or second connecting element.

17. The harmonic drive of claim 13, wherein the flexible transmission element has a U-shaped cross-section.

18. The harmonic drive of claim 17, wherein the U-shaped cross-section comprises a first leg and a second leg, the second leg longer than the first leg.

19. The harmonic drive of claim 18, wherein the first leg is configured with the running tooth system and the second leg is configured with the spline tooth system.

* * * * *